United States Patent
Miyagi et al.

(10) Patent No.: US 8,235,353 B2
(45) Date of Patent: Aug. 7, 2012

(54) WATER FAUCET DEVICE AND METHOD OF MANUFACTURING WATER FAUCET EQUIPMENT CONTAINING SAME

(75) Inventors: Takafumi Miyagi, Kitakyushu (JP); Shoji Miura, Kitakyushu (JP)

(73) Assignee: Toto Ltd. (JP)

( * ) Notice: Subject to any disclaimer, the term of this patent is extended or adjusted under 35 U.S.C. 154(b) by 174 days.

(21) Appl. No.: 12/855,504

(22) Filed: Aug. 12, 2010

(65) Prior Publication Data

US 2011/0005608 A1  Jan. 13, 2011

Related U.S. Application Data

(63) Continuation of application No. PCT/JP2009/052542, filed on Feb. 16, 2009.

(30) Foreign Application Priority Data

Feb. 14, 2008  (JP) .................................. 2008-33452

(51) Int. Cl.
  *F16K 31/12*  (2006.01)
(52) U.S. Cl. ........................................ 251/28; 251/61.2
(58) Field of Classification Search .................... 251/25, 251/28, 30.02–30.05, 61.2, 61.4, 321
  See application file for complete search history.

(56) References Cited

U.S. PATENT DOCUMENTS

| | | | | |
|---|---|---|---|---|
| 5,960,485 A | * | 10/1999 | Mihara | 4/443 |
| 5,961,051 A | * | 10/1999 | Matsui et al. | 239/533.1 |
| 6,659,373 B1 | * | 12/2003 | Heren et al. | 239/570 |
| 7,296,593 B2 | * | 11/2007 | Matsui et al. | 137/597 |
| 7,341,239 B2 | * | 3/2008 | Hodel et al. | 251/230 |
| 7,398,954 B2 | * | 7/2008 | Heren et al. | 251/148 |
| 7,694,935 B2 | * | 4/2010 | Wang | 251/54 |
| 7,748,649 B2 | * | 7/2010 | Fujii et al. | 239/548 |
| 7,793,365 B2 | * | 9/2010 | Miura et al. | 4/678 |

FOREIGN PATENT DOCUMENTS

| | | |
|---|---|---|
| JP | 03-128762 | 12/1991 |
| JP | 2007-262779 | 10/2007 |

OTHER PUBLICATIONS

Written Opinion of the International Searching Authority; PCT/JP2009/052542; May 12, 2009.
International Search Report; PCT/JP2009/052542; May 12, 2009.

* cited by examiner

*Primary Examiner* — John Fristoe, Jr.
*Assistant Examiner* — Marina Tietjen
(74) *Attorney, Agent, or Firm* — Studebaker & Brackett PC; Donald R. Studebaker (57) ABSTRACT

The present invention is a water faucet device (2a) connected to pipes and buried in a mounting surface (W1), including: a water conveying portion main body (20) having an inflow-side connecting portion (20a), an outflow-side connecting portion (20b), and double pipe connecting portions (20c, 20d) respectively communicating with these; a push valve (30) opened and closed by a pushing operation; a valve receiving main body, positioned at a predetermined position relative to the mounting surface, and having double pipe joining portions (26a, 26b) slidably joined to a double pipe connecting portion in a direction approximately perpendicular to the mounting surface, and a push valve receiving recess (26c) for receiving the push valve; and a push button unit (10a) disposed on the mounting surface, furnished with a push button (12b) for pushing the operating portion of a push valve.

9 Claims, 7 Drawing Sheets

WATER FAUCET DEVICE AND METHOD OF MANUFACTURING WATER FAUCET EQUIPMENT CONTAINING SAME

TECHNICAL FIELD

The present invention relates to a water faucet device, and more particularly to a water faucet device used by connecting it to piping buried in a mounting surface, and to a method for manufacturing water faucet equipment containing the water faucet device.

BACKGROUND ART

Laid Open Unexamined Patent Application 2007-262779 (Patent Citation 1) discloses a water faucet device. This water faucet device is set into a wall for use; in water faucet devices of this type, variations in the distance between pipes attached to the water faucet device and the wall surface pose problems when installing the device. In the water faucet device of Laid Open Unexamined Patent Application 2007-262779, error caused by variability is absorbed using a height adjustment means disposed to protrude from a spindle rotated to operate the valve. That is, an operating handle gripped by the user is positioned by bringing it into contact with the height adjustment means, and the operating handle is positioned in an appropriate location by adjusting the amount of protrusion from the height adjustment means spindle. The variability in distance between pipes connected to the water faucet device and the wall surface is thus absorbed, so that the operating handle can always be attached in an appropriate location.
Patent Citation 1
Laid Open Unexamined Patent Application 2007-262779

DISCLOSURE OF THE INVENTION

Problems the Invention Seeks to Resolve

However, in the water faucet device of Laid Open Unexamined Patent Application 2007-262779, the problem arises that it is difficult to secure sufficient accuracy due to the structure whereby adjustment of the operating handle position is done at the site of the water faucet device installation. In particular, in water faucet devices with a push system for switching between spouting and stopping water by push-operating a push button, the switching operation between spouting and stopping water becomes uncertain due to insufficient positioning accuracy between the push button and the push valve pushed thereby.

In addition; in the water faucet device of Laid Open Unexamined Patent Application 2007-262779, variability is absorbed by the amount of protrusion in the height adjustment means protruding from the spindle, leading to the problem that sufficient variability cannot be absorbed in operating handles with a small amount of protrusion from the wall surface.

Therefore the present invention has the object of providing a water faucet device which can be installed with sufficient accuracy without on-site adjustment, and to a method for manufacturing water faucet equipment containing the same.

The present invention also has the object of providing a water faucet device capable of securing a sufficient absorption margin for variability even when the amount of protrusion from the wall surface is small, and of providing a method for manufacturing water faucet equipment containing the same.

Means for Solving the Problems

In order to resolve the above-described problems, the present invention is a water faucet device used by connecting to pipe buried in a mounting surface, comprising: a water conveying portion main body including an inflow-side connecting portion connected to an inflow-side pipe, an outflow-side connecting portion connected town outflow-side pipe, and a double pipe connecting portion respectively communicating with the inflow-side connecting portion and the outflow-side connecting portion; a push valve capable of switching between an open and closed state by a push operation; a valve receiver main body positioned at a predetermined position with respect to the mounting surface, and including a double pipe joining portion connected with the double pipe connecting portion so as to be slidable in an approximately perpendicular direction with respect to the mounting surface, and a push valve receiving recess for receiving the push valve, for communicating with the double pipe connecting portion; and a push button unit disposed on the mounting surface, including a push button for pushing an operating portion of the push valve.

In the present invention thus constituted, the water conveying portion main body double pipe connecting portion and the valve receiver main body double pipe joining portion are joined so as to be slidable in an approximately perpendicular direction with respect to the mounting surface. The operating portion of the push valve received by the valve receiver main body push valve receiving recess is push operated using the push button in the push button unit, disposed on the mounting surface.

In the present invention thus constituted, the double pipe connecting portion and the double pipe joining portion are connected so as to be slidable in approximately a perpendicular direction relative to the mounting surface, therefore a sufficient variability absorption margin can be secured even when the amount of protrusion from the push button unit mounting surface is small. When the relative positions of the valve receiver main body and the push button unit are uniquely determined, the relative positions between the push button and the push valve can be positioned with sufficient accuracy without the need for adjustment at the installation site.

In the present invention, the double pipe connecting portion and the double pipe joining portion are preferably constituted so that their internal flow path cross-sectional area is approximately constant irrespective of the connecting positions between them. The present invention thus constituted enables the prevention of influence by the water faucet device on the spouted water flow volume caused by changes in flow path cross-sectional area due to the joining state between the water conveying portion main body and the valve receiver main body.

In the present invention, the double pipe connecting portion and the double pipe joining portion are preferably formed concentrically.

In the present invention thus constituted, the double pipe connecting portion and the double pipe joining portion can be easily formed, as can a seal portion for assuring watertightness between them.

In the present invention, the valve receiver main body preferably comprises a first main body member in which a double pipe joining portion is formed, and a second main body member contacting a mounting surface.

In the present invention thus constituted, the second main body member can make common use of one type without preparing various types of first main body members according to burying depth, even when there are major differences in the depth at which pipes are buried in the mounting surface.

In the present invention, the first main body member and the second main body member are joined by threads respectively formed therein.

In the'present invention thus constituted, the first main body member can be easily exchanged at the installation site.

In the present invention, the valve receiver main body and the water conveying portion main body are preferably joined by screws, and the valve receiver main body and water conveying portion main body can be joined at a first position at predetermined rotational position, and at a second position rotated 90° relative to the first position.

In the present invention thus constituted, the same water faucet device can be connected even when the direction of pipes to be connected differs by 90°.

In the present invention, the inflow-side connecting portion and the outflow-side connecting portion are preferably formed to protrude from both sides of the water conveying portion main body, extending along the same straight line, forward of the back end surface of the water conveying portion main body.

In the present invention thus constituted, the distance from the wall surface to the back end surface of the water conveying portion main body can be kept short while assuring a large absorption margin for pipe positioning error.

The present invention is also a method for manufacturing water faucet equipment in which the water faucet device is buried, comprising steps of: connecting inflow-side piping to the water conveying portion main body inflow-side connecting portion; a step for connecting outflow-side piping to the water conveying portion main body outflow-side connecting portion; attaching to the double pipe connecting portion a pressure resistance inspection jig for closing off opening portions of the water conveying portion main body double pipe connecting portion and a protective cover for covering the vicinity of the double pipe connecting portion; performing a pressure resistance inspection of the water conveying portion main body and a connecting portion between the inflow-side and outflow-side piping; forming a mounting surface in which the water conveying portion main body, the inflow-side piping, and the outflow-side piping are buried; removing the pressure resistance inspection jig and the protective cover; for joining the double-pipe joining portion of the valve receiver main body to the double pipe connecting portion; and attaching the push button unit to the mounting surface.

In the present invention thus constituted, a pressure resistance inspection is performed by attaching the pressure-resistance inspection jig to the opening portion of the double pipe connecting portion in a state in which only the water conveying portion main body is connected. After the pressure resistance inspection, a mounting surface is formed with the double pipe connecting portion protected by the protective cover. Next, the water faucet equipment is completed by attaching the valve receiver main body, the push valve, and the push button unit. Note that in the step for joining the double pipe joining portion on the valve receiver main body to the double pipe connecting portion on the water conveying portion main body, the valve receiver main body to which a push valve was previously attached may be joined to the water conveying portion main body, or the push valve may be attached to the valve receiver main body after the valve receiver main body is joined to the water conveying portion main body.

In the present invention thus constituted, the pressure resistance inspection can be implemented without the water faucet device used in the water faucet equipment being assembled, and a mounting surface can be formed without damaging the double pipe connecting portion.

In the method for manufacturing water faucet equipment of the present invention, the step for attaching a pressure resistance inspection jig and a protective cover to a double pipe connecting portion preferably includes a step for affixing the pressure resistance inspection jig and the protective cover to female attaching threads formed in the water conveying portion main body using screws, and for screw-attaching the valve receiver main body to the water conveying portion main body using female attaching threads.

In the present invention thus constituted, the pressure resistance inspection jig and the protective cover can be screw-attached without changing the constitution of the water conveying portion main body.

Effect of the Invention

In the water faucet device and manufacturing method for water faucet equipment containing same of the present invention, sufficiently accurate installation can be performed without adjustment on the installation site.

The water faucet device and manufacturing method for water faucet equipment containing same of the present invention also enables the securing of sufficient absorption margin for variability, even when the amount of protrusion from the wall surface is small.

BEST MODE FOR PRACTICING THE INVENTION

Next, referring to the attached drawings, we discuss a water faucet device according to an embodiment of the present invention.

Figure 1:
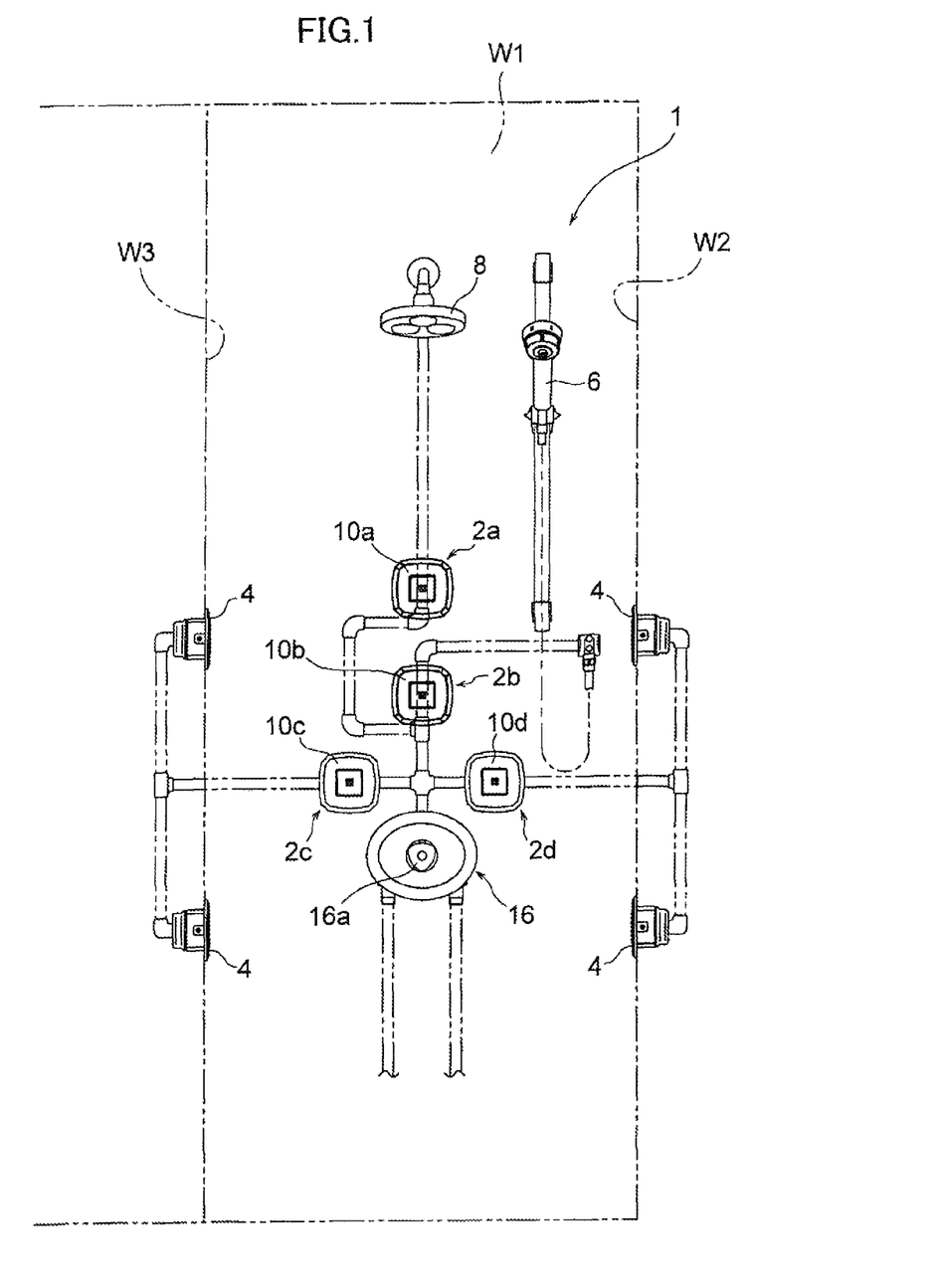
Figure 2:
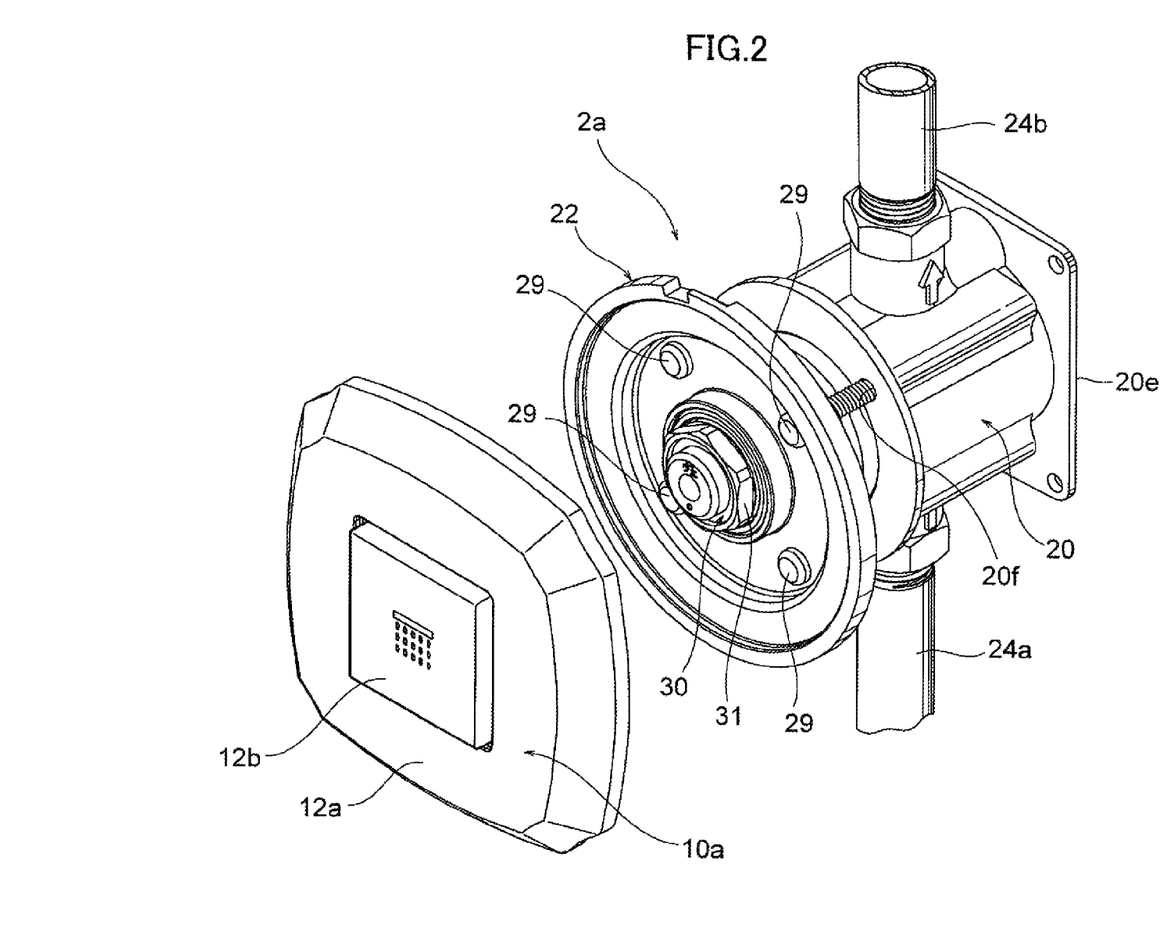
FIG. 2 A perspective drawing showing the entirety of the water faucet device of the present embodiment.
Figure 3:
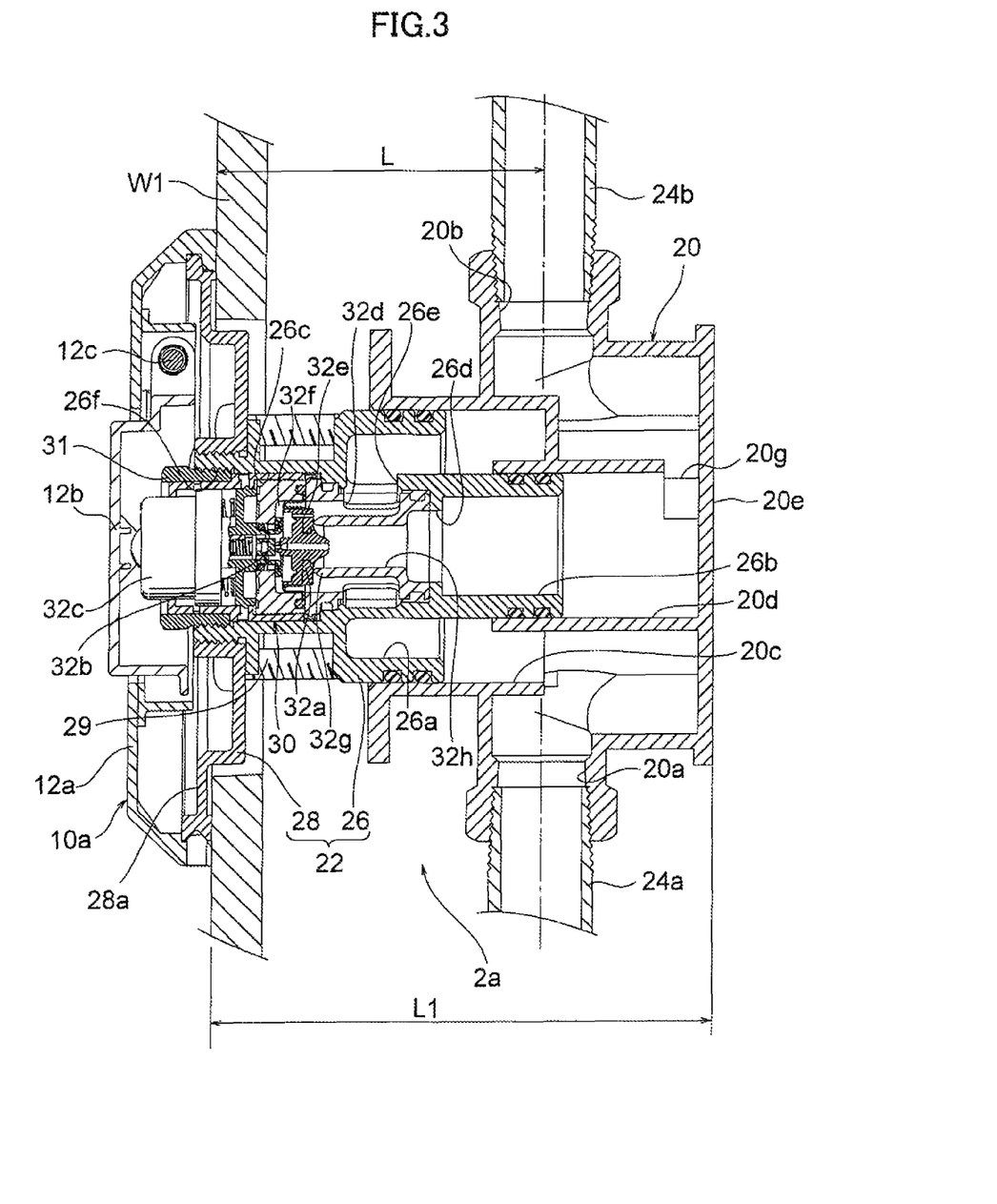
FIG. 3 A cross-section showing the entirety of the water faucet device of the present embodiment.
Figure 4:
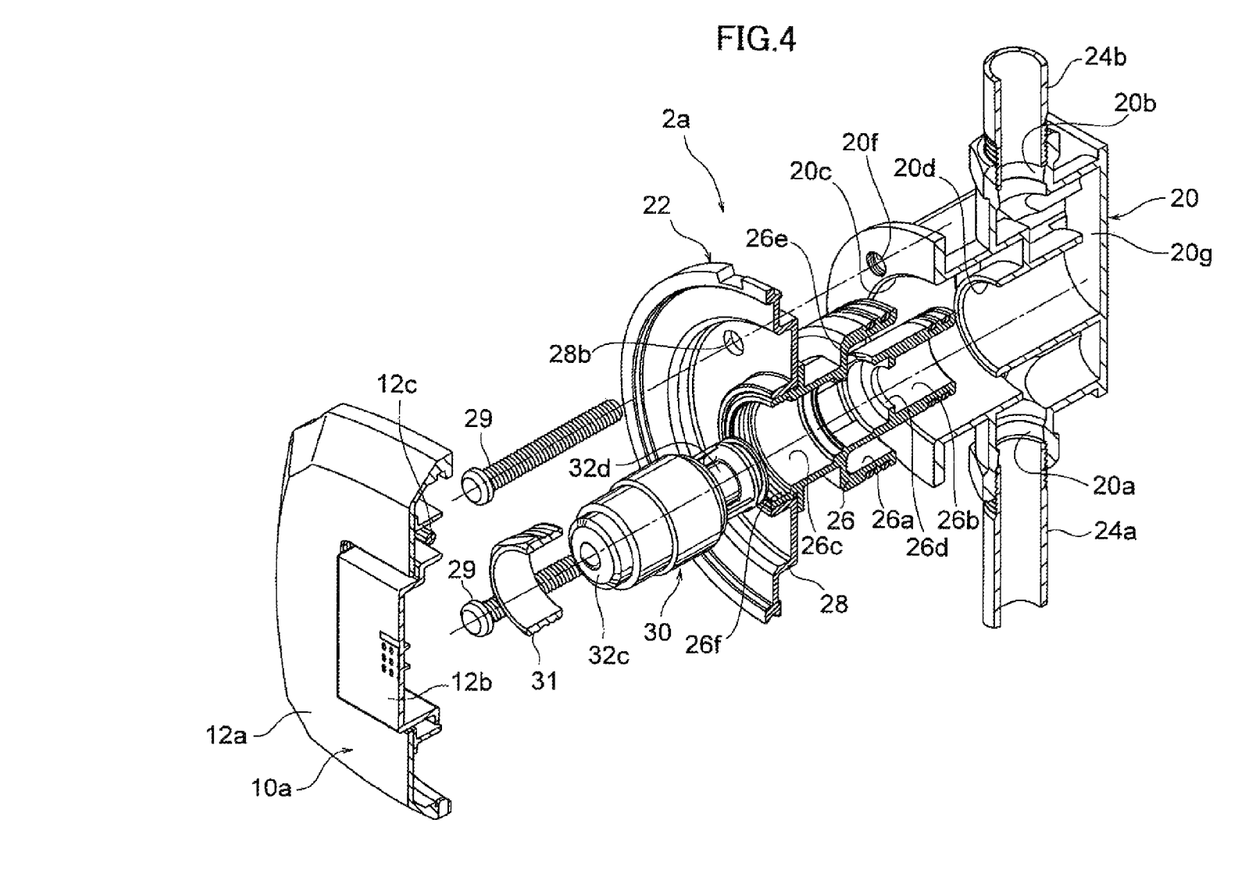
FIG. 4 An exploded perspective drawing showing a water faucet device of an embodiment of the present invention.

FIG. 1 shows an entire water faucet equipment in which a water faucet device according to an embodiment of the present invention is buried in a wall surface serving as mounting surface. FIG. 2 is a perspective drawing showing the entirety of the water faucet device of the present embodiment. FIG. 3 is a cross-section of the water faucet device of the present embodiment, and FIG. 4 is an exploded perspective drawing of the water faucet device of the present embodiment.

As shown in FIG. 1, the water faucet equipment 1 using, the water faucet device of this embodiment of the present invention has four water faucet devices $2a$, $2b$, $2c$, and $2d$; body shower heads 4 for body showering; a hand shower head 6 for hand showering; an over shower head 8 for over head showering; and a thermo-faucet 16 for adjusting spouted water temperature.

Each of the water faucet devices $2a$, $2b$, $2c$, and $2d$ is buried in the directly facing wall W1 serving as mounting surface; these are all interconnected by pipes buried in the wall W1. Disposed in the wall W1 are a push button unit $10a$ for spouting water from the overhead shower; a push button unit $10b$ for spouting water from the hand shower; and push button units $10c$ and $10d$ for spouting water from the body shower.

In addition, a thermo-faucet 16 for adjusting the temperature of spouted water is buried under each of the water faucet devices $2a$, $2b$, $2c$ and $2d$, and a temperature adjustment knob $16a$ is provided on the thermo-faucet 16 to adjust the temperature setting.

There are two body shower heads 4 buried on each of walls W2 and W3 on the left and right.

The water faucet equipment 1 is constituted so that water is spouted from the over shower head 8 by a push operation of the push button unit 10*a*; water is spouted from the hand shower head 6 by a push operation of the push button unit 10*b*; and water is spouted from each of the body shower heads 4 by a push operation of the push button units 10*c* and 10*d*. That is, a push-type water faucet is disposed on the rear surface of each push button unit, and switching between spouting and stopping water can be accomplished by push-operating the push buttons. The temperature of hot water spouted from each of the shower heads can be adjusted by the temperature adjustment knob 16*a*.

Next, referring to FIGS. 2 through 4, we discuss a water faucet device according to an embodiment of the present invention. Note that we here discuss the structure of the water faucet device 2*a* connected to the over shower head 8, but the other water faucet devices 2*b*, 2*c*, and 2*d* are similarly constituted.

As shown in FIG. 2, the water faucet device 2*a* according to an embodiment of the present invention has a water conveying portion main body 20 connected to pipes on the inflow side and the outflow side; a valve receiver main body 22, slidably joined to the water conveying portion main body 20; a push valve 30 housed in this valve receiver main body 22; and a push button unit 10*a* disposed on the wall W1.

The water conveying portion main body 20, as shown, in FIGS. 3 and 4, has an inflow-side connecting portion 20*a* connected to the inflow-side pipe 24*a*; an outflow-side connecting portion 20*b* connected to the outflow-side pipe 24*b*; a water conveying portion main body inflow pipe 20*c* communicating with the inflow-side connecting portion 20*a*; and a water conveying portion main body outflow pipe 20*d* communicating with the outflow-side connecting portion 20*b*.

The inflow-side connecting portion 20*a* and the outflow-side connecting portion 20*b* are formed to protrude from both sides of the water conveying, portion main body 20, and to extend in a straight line. The inflow-side connecting portion 20*a* and the outflow-side connecting portion 20*b* are also formed to be positioned in front of the water conveying portion main body 20 back end surface 20*e*. Therefore hot water flowing in from the inflow-side pipe 24*a* first flows to the back end side of the water conveying portion main body 20, then flows forward into the water conveying portion main body 20.

The water conveying portion main body inflow pipe 20*c* and the water conveying portion main body outflow pipe 20*d* are respectively round pipes concentrically disposed in a nested fashion, and the water conveying portion main body outflow pipe 20*d* is disposed on the inner side of the water conveying portion main body inflow pipe 20*c*. The front end surface of the water conveying portion main body outflow pipe 20*d* is positioned behind the front end surface of the water conveying portion main body inflow pipe 20*c*, and the water conveying portion main body outflow pipe 20*d* opens at the back portion inside the water conveying portion main body inflow pipe 20*c*. Note that the water conveying portion main body inflow pipe 20*c* and the water conveying portion main body outflow pipe 20*d* form a double pipe connecting portion.

The valve receiver main body 22 comprises two members: a first main body member 26 joined to the water conveying portion main body 20, and a second main body member 28 brought in contact with the wall W1.

The first main body member 26 has a valve receiver main body inflow pipe 26*a* and a valve receiver main body outflow pipe 26*b*. The valve receiver main body inflow pipe 26*a* and the valve receiver main body outflow pipe 26*b* are round pipes respectively concentrically disposed in a nested manner; the valve receiver main body outflow pipe 26*b* is disposed on the inner side of the valve receiver main body inflow pipe 26*a*.

The back end surface of the valve receiver main body outflow pipe 26*b* is disposed to protrude behind the back end surface of the valve receiver main body inflow pipe 26*a*, and the valve receiver main body outflow pipe 26*b* protrudes rearward from the opening at the back end of the valve receiver main body inflow pipe 26*a*. Note that the valve receiver main body inflow pipe 26*a* and the valve receiver main body outflow pipe 26*b* form a double pipe joining portion.

The valve receiver main body inflow pipe 26*a* is inserted into the water conveying portion main body inflow pipe 20*c* on the water conveying portion main body 20 and connected in a watertight manner using two O rings. Similarly, the valve receiver main body outflow pipe 26*b* is inserted into the water conveying portion main body outflow pipe 20*d* on the water conveying portion main body 20 and connected in a watertight manner using two O rings. Therefore the double pipe connecting portion formed of the water conveying portion main body inflow pipe 20*c* and the water conveying portion main body outflow pipe 20*d* is joined in a watertight manner to the double pipe joining portion formed of the valve receiver main body inflow pipe 26*a* and the valve receiver main body outflow pipe 26*b*. The amount of insertion by which the double pipe joining portion is inserted into the double pipe connecting portion can be varied over a predetermined range while maintaining watertightness, therefore the valve receiver main body 22 and the water conveying portion main body 20 can be connected so as to be slidable in a direction approximately perpendicular to the wall W1.

Moreover, a push valve receiving recess 26*c* for receiving the push valve 30 is formed at the front end portion of the first main body member 26. This push valve receiving recess 26*c* is positioned concentrically with respect to the valve receiver main body outflow pipe 26*b*, and opens toward the front. An outflow water conveying hole 26*d* is formed at the back end surface of the push valve receiving recess 26*c*; and the push valve receiving recess 26*c* and valve receiver main body outflow pipe 26*b* are joined via this outflow water conveying hole 26*d*. Furthermore, an inflow water conveying hole 26*e* is formed on the back end side surface of the push valve receiving recess 26*c*, and the push valve receiving recess 26*c* is joined to the valve receiver main body inflow pipe 26*a* via this inflow water conveying hole 26*e*.

Furthermore, a female thread 26*f* is formed on the inner circumference of the front end portion of the push valve receiving recess 26*c*. The push valve 30 is affixed to the push valve receiving recess 26*c* by screwing a valve retainer 31 into the female thread 26*f* with the push valve 30 disposed inside the push valve receiving recess 26*c*.

The second main body member 28 is an approximately disc-shaped member, on the outer circumference of which a flange 28*a* is formed. This flange 28*a* is disposed such that its rear side contacts the surface of the wall W1. By this means, the valve receiver main body 22 and the push valve 30 attached thereto are positioned in an appropriate location relative to the wall W1. A female thread is formed at the center of the second main body member 28; the first main body member 26 and the second main body member 28 are joined by causing this female thread to engage a male screw formed on the front end portion external perimeter of the first main body member 26. As a variation, the first main body member 26 and the second main body member 28 may also be joined by silver alloy brazing or the like.

Furthermore, four holes 28*b* are formed on the second main body member 28 (FIG. 4); the valve receiver main body 22 is affixed to the water conveying portion main body 20 by engaging the screws 29 to the female attaching threads 20*f* formed on the water conveying portion main body 20 via the respective holes 28. That is, by tightening each of the screws 29 until the underside of the flanges 28a contact the wall W1, the valve receiver main body 22 is joined to the water conveying portion main body 20, and the valve receiver main body 22 is affixed to the wall W1.

The push button unit 10a has a frame portion 12a and a push button 12b attached so as to be rotatable relative to the frame portion 12a. The frame portion 12a is an approximately square member disposed on the wall W1, attached to the second main body member 28 so as to cover the second main body member 28. The push button 12b is an approximately square member disposed at the center of the frame portion 12a, supported by a shaft 12c so as to be rotatable with respect to the frame portion 12a. When a user push-operates the push button 12b, the rear surface thereof presses the operating portion 32c of the push valve 30 to open and close the push valve 30.

The push valve 30 is also held in an appropriate location of the valve receiver main body 22, and the push button unit 10a is attached to the second main body member 28 of the valve receiver main body 22, therefore the position of the push button 12b relative to the push valve 30 is uniquely defined, and both can be positioned with sufficient accuracy.

Next we discuss the constitution of the push valve 30

The push valve 30 has a main valve body 32a; a pilot valve 32b for opening and closing a pressure release hole in this main valve body 32a; and a operating portion 32c for moving the pilot valve 32b to open and close the pressure release hole. The pilot valve 32b is constituted so that by using a latch mechanism, it is alternately moved to the closed position or the open position of the pressure release hole each time the operating portion 32c is press-operated.

Hot water flowing from the valve receiver main body inflow pipe 26a into the push valve receiving recess 26c flows into the pressure chamber 32f through a small hole 32e provided on the main valve body 32a. When the pressure release hole on the main valve body 32a is closed by the pilot valve 32b, the pressure inside the pressure chamber 32f rises due to pressure from hot water flowing in from the small hole 32e. When the pressure inside the pressure chamber 32f rises, that pressure causes the main valve body 32a to be pressed in toward the back surface side (the right side in FIG. 3) of the water faucet device 2a, such that the main valve body 32a seats on the valve seat 32g and water flow is stopped.

Next, when the pilot valve 32b is moved toward the front surface side (the left side in FIG. 3) of the water faucet device 3a by the operation of the operating portion 32c, the pressure release hole on the main valve body 32a is opened and the pressure in the pressure chamber 32f drops. When the pressure in the pressure chamber 32f drops, the main valve body 32a is moved toward the front surface side of the water faucet device 2a, and the main valve body 32a separates from the valve seat 32g so that water is spouted. Once in the water spouting state, hot water flowing in from the inflow port 32d flows directly out to the outflow port 32h without passing through the pressure chamber 32f. That is, hot water flowing in from the inflow port 32d on the push valve 30 passes through the gap between the main valve body 32a and the valve seat 32g, flowing toward the downward side of the push valve 30 (the rear surface side of the water faucet device 2a) from the outflow port 32h.

Next we discuss the action of the water faucet device 2a according to an embodiment of the present invention.

First, when the push valve 30 is in a closed state, hot water flowing in from the inflow-side pipe 24a through the water conveying portion main body inflow pipe 20c, the valve receiver main body inflow pipe 26a, and the inflow water conveying hole 26e and into the push valve receiving recess 26c is stopped by the push valve 30, and no water is spouted. Next, when the push valve 30 is switched to an opened state by a user press-operating the push button 12b, hot water flowing into the push valve receiving recess 26c flows out from the outflow port 32h on the push valve 30. Hot water flowing out from the outflow port 32h flows through the outflow water conveying hole 26d, the valve receiver main body outflow pipe 26b, and the water conveying portion main body outflow pipe 20d into the high flow fixed flow valve 24 on the inflow side, and is spouted from the over shower head 8.

Figure 5:
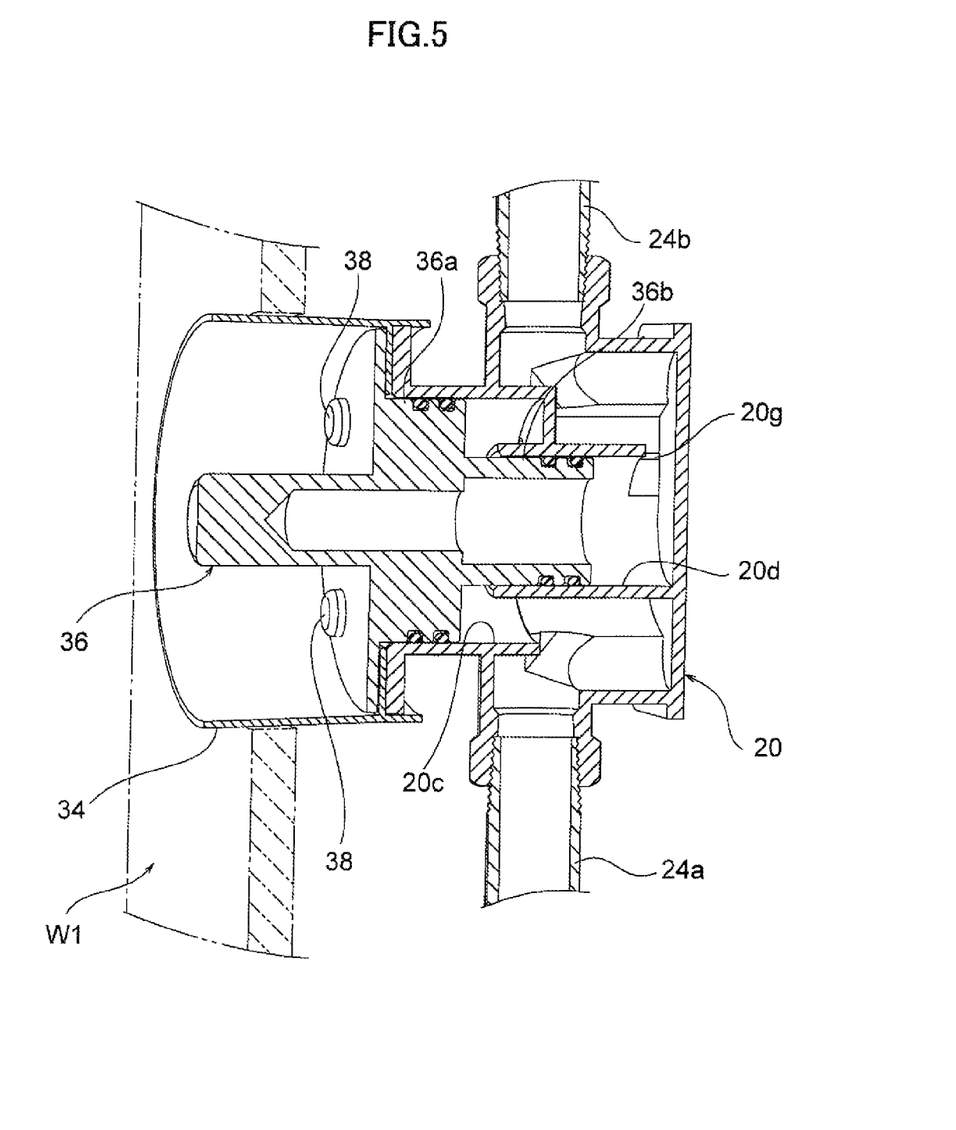
FIG. 5 A perspective cross-section showing a pressure resistance inspection jig and a protective cover attached to the water conveying portion main body.
Figure 6:
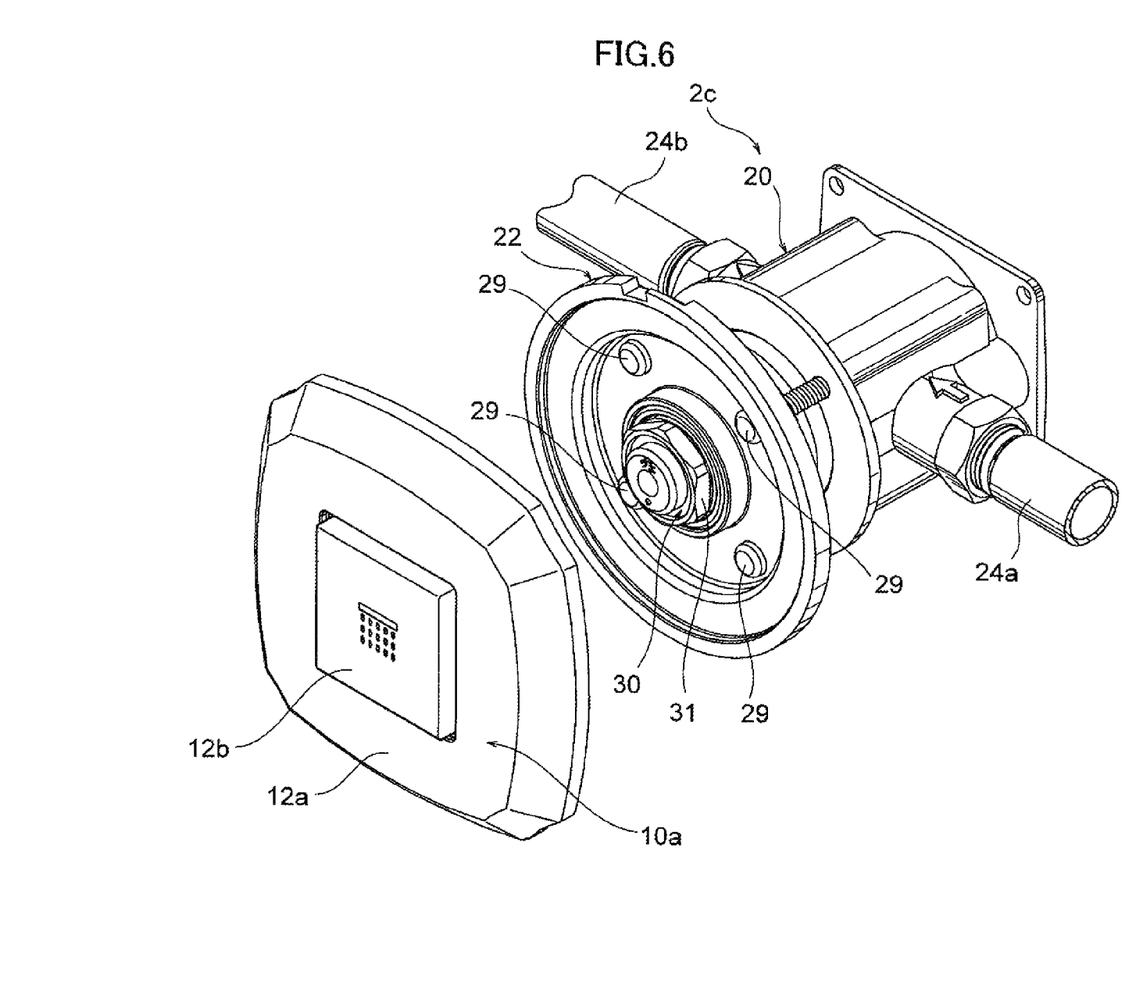
FIG. 6 A perspective view showing the entirety of a water faucet device in which the inflow-side and outflow-side piping is directed in the horizontal direction.
Figure 7:
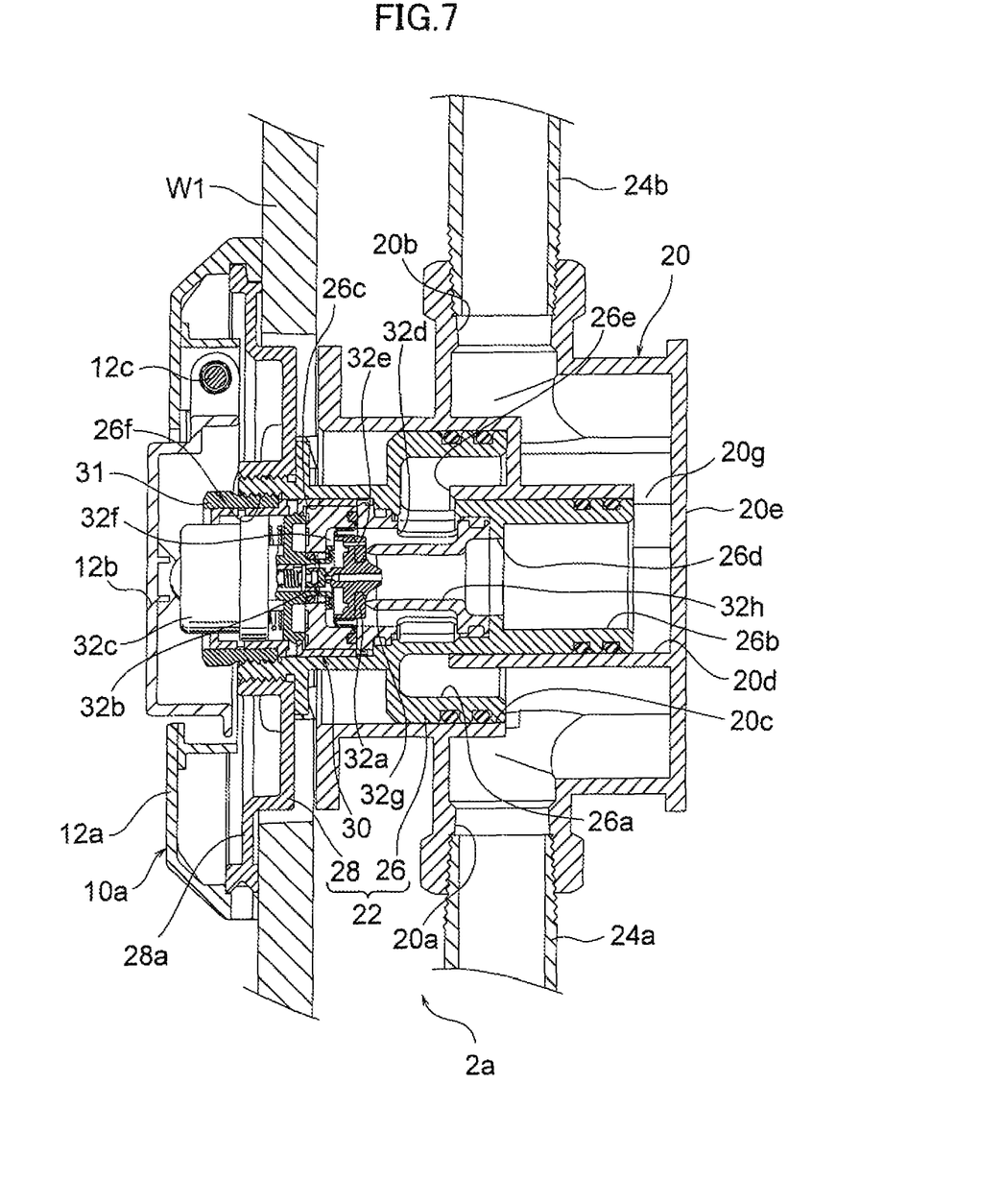
FIG. 7 A cross-section of a water faucet device in which the piping is disposed at a position near a wall surface.

Next, referring to FIGS. 5 through 7, we discuss a method for manufacturing water faucet equipment manufactured by burying a water faucet device in a wall. FIG. 5 is a perspective cross-section showing a pressure resistance inspection jig and a protective cover attached to the water conveying portion main body 20. FIG. 6 is a perspective view showing the entirety of a water faucet device in which the inflow-side, and outflow-side piping is directed in the horizontal direction. In addition, FIG. 7 is a cross-section of a water faucet device in which pipes are disposed at a position near a wall surface.

To manufacture the water faucet equipment 1, pipes buried on the back side of the wall are first attached at a position corresponding to the disposition of the water faucet devices 2a, 2b, 2c and 2d. These pipes are positioned so that the distance L (FIG. 3) from the center of the pipes to the intended finished surface of the wall W1 is approximately 55 mm. The water conveying portion main body 20 and thermo-faucet 16 of each water faucet device is connected to each pipe.

As shown in FIG. 5, after the connection of pipes to be buried in the wall W1 and the water conveying portion main body 20 on each of the pipes is completed, a protective cover 34 and a pressure resistance inspection jig 36 are attached to each of the water conveying portion main bodies 20.

The protective cover 34 is an approximately cylindrical member, attached so as to cover the vicinity of the double pipe connecting portion of the water conveying portion main body 20. The protective cover 34 is constituted to protrude further than the ultimately formed wall W1 shown by the imaginary line in FIG. 5.

The pressure resistance inspection jig 36 is a stepped columnar member with a flange, and is constituted to close the opening portion on the water conveying portion main body 20. In other words, the pressure resistance inspection jig 36 has columnar step portions 36a and 36b; step portion 36a is inserted into the water conveying portion main body inflow pipe 20c of the water conveying portion main body 20, and step portion 36b is inserted into the water conveying portion main body outflow pipe 20d; these are closed in a watertight manner.

The protective cover 34 and pressure resistance inspection jig 36 are affixed to the water conveying portion main body 20 by the four screws 38. Each screw 38 engages female attaching threads 20f (FIG. 4) formed in the water conveying portion main body 20. These female attaching threads 20f also serve as female threads for engaging each of the screws 29 (FIG. 4) used to affix the valve receiver main body 22 to the water conveying portion main body 20. Therefore after the protective cover 34 and the pressure resistance inspection jig 36 are removed, the screws 29 are screwed into the female attaching threads 20f to affix the valve receiver main body 22. It is also acceptable to use the same, screws as the attaching screws 38 and valve receiver main body 22 attaching screws 29 for the protective cover 34, and pressure resistance inspection jig 36.

After attaching the protective cover 34 and the pressure resistance inspection jig 36 to each of the water conveying portion main bodies 20, a predetermined water pressure is made to act on the interior of the pipes, and a confirmation is made that no water leakage from the pipe occurs. After completing the pressure resistance test, the wall W1 is formed at a predetermined position, and the pipes and each of the water conveying portion main bodies 20 are buried on the reverse side of the wall W1. A hole passing through the protective cover 34 is at this point opened in the wall W1 so that the protective cover 34 protrudes out from the wall W1. Mortar or the like can be filled into the space at the back side of the wall W1 to affix the pipes and the water conveying portion main bodies 20. In this case, penetration of mortar or other foreign objects into each of the water conveying portion main bodies 20 is prevented by the protective cover 34.

After forming the wall W1, the four screws 38 are removed and the protective cover 34 and pressure resistance inspection jig 36 are removed. The double pipe connecting portion of the water conveying portion main body 20 is thus exposed. Next, the double pipe joining, portion of the valve receiver main body 22 is joined to the double pipe connecting portion of the exposed water conveying portion main body 20. That is, the valve receiver main body 22 valve receiver main body inflow pipe 26a and valve receiver main body outflow pipe 26b are inserted into the water conveying portion main body 20 water conveying portion main body inflow pipe 20c and water conveying portion main body outflow pipe 20d.

Note that by pre-joining the valve receiver main body 22 first main body member 26 and second main body member 28, inserting the push valve 30 into the valve receiver main body 22 push valve receiving recess 26c, and engaging the valve retainer 31 in the valve receiver main body 22, the push valve 30 is pre-affixed to the push valve receiving recess 26c.

Note that the it is desirable to attach the push valve 30 to the valve receiver main body 22 at the time of shipment from the factory, but the push valve 30 may also be affixed to the valve receiver main body 22 on site, after the valve receiver main body 22 is joined to the water conveying portion main body 20.

Next, the four screws 29 are passed through each of the holes 28b (FIG. 4) in the valve receiver main body 22 and made to engage the female attaching threads 20f in the water conveying portion main body 20. Each of the screws 29, as shown in FIG. 3, is tightened until the rear side of the flange 28a contacts the surface of the wall W1.

Next, a push button unit 10a is attached to the flange 28a in contact with the wall W1. By this means, the valve receiver main body 22 and the push valve 30 are covered by the push button unit 10a. Here the position of the push valve 30 with respect to the valve receiver main body 22 and the position of the push button unit 10a with respect to the valve receiver main body 22 are precisely defined by the dimensions and shape of each component. The position of the push button unit 10a, which is to say, the push button 12b, relative to the push valve 30 is thus also precisely defined.

Similarly, the valve receiver main body 22, the push valve 30, and the push button unit and the like are assembled with respect to the water faucet device 2b connected to the hand shower head 6 and the water faucet devices 2c and 2d connected to the body shower heads 4.

However, as shown in FIG. 6, for the water faucet devices 2c and 2d, the inflow-side and outflow-side pipes are directed in a horizontal direction, therefore the water conveying portion main body 20 is attached in a 90° rotated state relative to the water conveying portion main body 20 shown in FIG. 2. Here, the four screws 29 are disposed at 90° center angle intervals on the same circle, therefore the valve receiver main body 22 is affixed to the water conveying portion main body 20 at 4 different positions. That is, the valve receiver main body 22 and the water conveying portion main body 20 can be attached at the first position shown in FIG. 2, the second position shown in FIG. 6, which is a position rotated 90° from the first position, a third position rotated 180° from the first position, and a fourth position rotated 270° from the first position. The same water faucet device can therefore be attached to both vertical pipes and horizontal pipes; the water faucet device 2c in FIG. 1 is attached using a second position, and the water faucet device 2d is attached at a fourth position.

Furthermore, the inflow-side connecting portion 20a and the outflow-side connecting portion 20b formed in the water conveying portion main body 20 are positioned to extend from between the two screws 29, i.e., in a direction at a center angle of 45° relative to the screws 29. The female attaching threads 20f engaging each of the screws 29 therefore do not interfere with the inflow-side connecting portion 20a and the outflow-side connecting portion 20b, so the female attaching threads 20f can be machined deeply. A long screw-in margin for engaging the screws 29 can thus be secured.

Pipes connected to the water faucet devices are installed so that the distance L between their centers and the surface of the wall W1 is 55 mm, but some error unavoidably arises in this distance L during installation. The water faucet device of the present embodiment is constituted to absorb a distance L error of up to plus or minus 10 mm. FIG. 3 shows the case in which the distance L is at the maximum of 65 mm; FIG. 7 shows the case in which the distance L is at the minimum of 45 mm. In other words, when the distance L is long, the amount of insertion of the double pipe joining portion of the valve receiver main body 22 relative to the double pipe connecting portion in the water conveying portion main body 20 is shortened, and when the distance L is short, the insertion amount is increased. Thus the double pipe joining portion is slidably connected in a direction approximately perpendicular to the wall W relative to the double pipe connecting portion. Watertightness between the valve receiver main body 22 and the water conveying portion main body 20 is maintained at either of the positions between FIG. 3 and FIG. 7.

Note that in the water faucet device 2a of the present embodiment, the inflow-side connecting portion 20a and the outflow-side connecting portion 20b to which the inflow-side and out-flow side pipes are connected are formed to be forward of the back end surface 20e of the water conveying portion main body 20. Thus a maximum pipe positioning error of 10 mm can be absorbed, while the distance L from the wall surface to the water conveying portion main body 20 back end surface 20e is kept at or below 100 mm.

Furthermore, when the double pipe joining portion is most deeply inserted into the double pipe connecting portion as shown in FIG. 7, the back end portion of the valve receiver main body inflow pipe 26a contacts the wall surface deep in the water conveying portion main body inflow pipe 20c, making it impossible to insert the valve receiver main body 22 any more deeply. In this state shown in FIG. 7, as well, the communicating pathway 20g which allows the water conveying portion main body outflow pipe 20d and the outflow-side connecting portion 20b to communicate has the same flow path area as the state shown in FIG. 3, without being constricted by the tip portion of the valve receiver main body outflow pipe 26b. In other words, the double pipe connecting portion and the double pipe joining portion are preferably constituted so that their internal flow path cross-sectional area is approximately fixed, irrespective of the connecting positions between them.

Also, in either of the cases shown in FIGS. 3 and 7, the relative positions of the push button 12b and the push valve 30 are uniquely determined by the dimensions and shapes of the valve receiver main body 22 and the push button unit 10a, therefore sufficiently accurate positioning can be achieved without relying on adjustment at the installation site.

Note that in the above-described embodiment, the distance L from the wall W1 to the middle of the pipe was defined as approximately 55 mm, but when this distance L is even longer, a valve receiver main body 22 with a longer valve receiver main body inflow pipe 26a and valve receiver main body outflow pipe 26b is used. In such cases, the same second main body member 28 can be used, exchanging only the valve receiver main body 22 first main body member 26.

In the water faucet device of the present invention, the double pipe connecting portion and the double pipe joining portion are connected so as to be slidable in approximately a perpendicular direction relative to the wall surface, therefore a sufficient variability absorption margin can be secured even when the amount of protrusion from the push button unit mounting surface is small. That is, in the water faucet device of the present invention, variability is not absorbed by adjusting the portion protruding from the mounting surface; rather, variability is absorbed in the water conveying portion buried in the mounting surface, constituted by the water conveying portion main body and the valve receiver main body, so a sufficient variability absorption margin can still be obtained even when the amount of protrusion of the push button unit from the mounting surface is small.

In the water faucet device of the present embodiment, the relative positions of the valve receiver main body and the push button unit are uniquely determined, therefore the relative positions between the push button and the push valve can be positioned with sufficient accuracy without on-site adjustment at the installation site.

In addition, in the water faucet device of the present embodiment there is no location at which the flow path cross-sectional area is restricted even when the double pipe joining portion is maximally inserted into the double pipe connecting portion, therefore influence by the water faucet device on the spouted water flow volume caused by changes in flow path surface area due to the joining state between the water conveying portion main body and the valve receiver main body can be prevented.

In the water faucet device of the present embodiment, the joining portion of the water conveying portion main body and the valve receiver main body has a double pipe structure, therefore watertightness can be made more reliable than when two pipes are independently connected. In other words, when two pipes are independently connected, a difference in the pressures of water flowing in each pipe causes an eccentric force to act between the water conveying portion main body and the valve receiver main body, which in turn leads to a loss of parallelness between the water conveying portion main body and the valve receiver main body. When parallelness between the water conveying portion main body and the valve receiver main body is lost, the sealing characteristics at the connecting portions of each of the pipes degrade, possibly leading to water leakage or the like. In the water faucet device of the present embodiment, the two pipes are nested, so this type of problem can be avoided. Moreover, in the water faucet device of the present embodiment, the two pipes are concentrically formed, therefore the double pipe joining portion and the double pipe connecting portion can be easily and accurately formed.

Moreover, in the water faucet device of the present embodiment, the valve receiver main body comprises a first main body member and a second main body member, therefore the first main body member can be appropriately exchanged according to burial depth, and the water faucet device can be attached at a variety of installation sites.

In the water faucet device of the present embodiment, the first main body member and second main body member are joined by screws, therefore the first main body member can be easily exchanged at the installation site.

Moreover, in the water faucet device of the present embodiment, the valve receiver main body and the water conveying portion main body can be joined at a first position and at a second position rotated 90° from this first position, and at third and fourth positions, therefore the same water faucet device can be connected whether the pipes to be connected are disposed vertically or horizontally.

In the water faucet device of the present embodiment, the inflow-side connecting portion and the outflow-side connecting portion are formed forward of the back end surface of the water conveying portion main body, therefore the distance from the wall surface up to the back end surface of the water conveying portion main body can be kept short while securing a large pipe positioning error absorption margin.

Furthermore, in the method for manufacturing the water faucet equipment of this embodiment of the present invention, the pressure resistance inspection can be implemented without the water faucet device used in the water faucet equipment being assembled, and a mounting surface can be formed without damaging the double pipe connecting portion.

Also, in the method for manufacturing the water faucet equipment of this embodiment of the present invention, the female threads for attaching the pressure resistance inspection jig and the protective cover also serve as female threads for affixing the valve receiver main body, therefore the pressure resistance inspection jig and the protective cover can be screw-affixed without changing the constitution of the water conveying portion main body.

We have discussed a preferred embodiment of the present invention above, however various changes can be added to the above-described embodiment. In particular, in the above-described embodiment, the double pipe connecting portion and the double pipe joining portion are constituted as concentrically disposed round pipes, but each pipe could also be disposed in a non-concentric manner, and need not be a round pipe.

BRIEF DESCRIPTION OF FIGURES

FIG. 1A diagram showing an entire water faucet equipment in which a water faucet device according to an embodiment of the present invention is buried in a wall.

EXPLANATION OF REFERENCE NUMERALS

1 Water faucet equipment
2a, 2b, 2c, 2d Water faucet devices according to an embodiment of the present invention
4 Body shower heads
6 Hand shower head
8 Over shower head
10a, 10b, 10c, 10d Push button units
12a Frame portion
12b Push button
12c Shaft
16 Thermo-faucet
16a Temperature adjustment knob
20 Water conveying portion main body
20a Inflow-side connecting portion
20b Outflow-side connecting portion
20c Water conveying portion main body inflow pipe
20d Water conveying portion main body outflow pipe
20e Back end surface
20f Female attaching threads
20g Communicating pathway
22 Valve receiver main body
24a Inflow-side pipe
24b Outflow-side pipe
26c Push valve receiving recess
26d Outflow water conveying hole
26e Inflow water conveying hole
26f Female thread
28 Second main body member
28a Flange
28b Holes
29 Screws
30 Push valve
31 Valve retainer
32a Main valve body
32b Pilot valve
32c Operating portion
32d Inflow port
32e Small hole
32f Pressure chamber
32g Valve seat
32h Outflow port
34 Protective cover
36 Pressure resistance inspection jig
36a, 36b Step portions
38 Screws

The invention claimed is:

1. A water faucet device used by connecting to pipe buried in a mounting surface, comprising:
a water conveying portion main body including an inflow-side connecting portion connected to an inflow-side pipe; an outflow-side connecting portion connected to an outflow-side pipe, and a double pipe connecting portion respectively communicating with the inflow-side connecting portion and the outflow-side connecting portion;
a push valve capable of switching between an open and closed state by a push operation;
a valve receiver main body positioned at a predetermined position with respect to the mounting surface, including with a double pipe joining portion connected to the double pipe connecting portion so as to be slidable in an approximately perpendicular direction with respect to the mounting surface, and a push valve receiving recess for receiving the push valve, for communicating with the double pipe connecting portion; and
a push button unit disposed on the mounting surface, including a push button for pushing an operating portion of the push valve.

2. The water faucet device according to claim 1, wherein the double pipe connecting portion and the double pipe joining portion are constituted so that their internal flow path cross-sectional area is approximately constant irrespective of the connecting positions between them.

3. The water faucet device according to claim 1, wherein the double pipe connecting portion and the double pipe joining portion are formed concentrically.

4. The water faucet device according to claim 1, wherein the valve receiver main body comprises a first main body member in which the double pipe connecting portion is formed, and a second main body member in contact with the mounting surface.

5. The water faucet device according to claim 4, wherein the first main body member and the second main body member are joined together using threads respectively formed in the first main body member and the second main body member.

6. The water faucet device according to claim 1, wherein the valve receiver main body and the water conveying portion main body are joined by screws, and the valve receiver main body and water conveying portion main body can be joined at a first position at predetermined rotational position, and at a second position rotated 90° relative to the first position.

7. The water faucet device according to claim 1, wherein the inflow-side connecting portion and the outflow-side connecting portion are formed to protrude from two side surfaces of the water conveying portion main body and extend along the same straight line, and are formed to be forward of the back end surface of the water conveying portion main body.

8. A method for manufacturing water faucet equipment in which the water faucet device according to claim 1 is buried, comprising steps of:
connecting inflow-side pipe to the water conveying portion main body inflow-side connecting portion;
connecting outflow-side pipe to the water conveying portion main body outflow-side connecting portion;
attaching to the double pipe connecting portion a pressure resistance inspection jig for closing off opening portions of the water conveying portion main body double pipe connecting portion and a protective cover for covering the vicinity of the double pipe connecting portion;
performing a pressure resistance inspection of the water conveying portion main body and a connecting portion between the inflow-side and outflow-side pipe;
forming a mounting surface in which the water conveying portion main body, the inflow-side pipe, and the outflow-side pipe are buried;
removing the pressure resistance inspection jig and the protective cover;
joining the double pipe joining portion of the valve receiver main body to the double pipe connecting portion; and
attaching the push button unit to the mounting surface.

9. The method for manufacturing water faucet equipment according to claim 8, wherein the step for attaching a pressure resistance inspection jig and a protective cover to a double pipe connecting portion includes a step for affixing the pressure resistance inspection jig and the protective cover to female attaching threads formed in the water conveying portion main body using screws, and the valve receiver main body is screw-attached, to the water conveying portion main body using female attaching threads.

* * * * *